United States Patent [19]

Tong

[11] Patent Number: 4,896,269

[45] Date of Patent: Jan. 23, 1990

[54] JOB SHOP SCHEDULING AND PRODUCTION METHOD AND APPARATUS

[75] Inventor: David W. Tong, Scotia, N.Y.

[73] Assignee: General Electric Company, Schenectady, N.Y.

[21] Appl. No.: 161,513

[22] Filed: Feb. 29, 1988

[51] Int. Cl.$^4$ .............................................. G06F 15/46
[52] U.S. Cl. .................................. 364/468; 364/194; 364/401
[58] Field of Search ........ 364/468, 401, 402, 191–194, 364/300

[56] References Cited

U.S. PATENT DOCUMENTS

| | | | |
|---|---|---|---|
| 3,703,725 | 11/1972 | Gomersall et al. | 364/468 X |
| 4,646,238 | 2/1987 | Carlson, Jr. et al. | 364/468 X |
| 4,648,023 | 3/1987 | Powell | 364/468 X |
| 4,661,912 | 4/1987 | Imanishi | 364/468 X |
| 4,698,766 | 10/1987 | Entwistle et al. | 364/468 |
| 4,700,295 | 10/1987 | Katsof et al. | 364/401 |

OTHER PUBLICATIONS

"A Review of Production Scheduling" by S. C. Graves, Operations Research, vol. 29, 1981, pp. 646–675.
"A Survey of Scheduling Rules" by Panwalker et al., Operations Research, vol. 25, 1977, pp. 45–61.
"Heuristics in Job Shop Scheduling" by Gere, Management Science, vol. 13, 1966, pp. 167–190.
"How to Win Productivity in Manufacturing" by Sandman et al., Yellow Book of Pa., Dresher, Pa., 1980, pp. 49–50.

Primary Examiner—Joseph Ruggiero
Attorney, Agent, or Firm—Paul R. Webb, II; James C. Davis, Jr.

[57] ABSTRACT

A method for the efficient scheduling of a first plurality of jobs and the performance of the jobs on a second plurality of processing machines uses various heuristic rules in order to meet scheduling objectives. Initially, each job is scheduled on the machines without regard to the scheduling of any other job. Job scheduling conflicts are then identified and a priority index for each conflict is computed. For each job step involved in the highest priority conflict, a flexibility index is computed. Based on the flexibility index, the highest priority conflict is resolved by relaxing one or more steps of one or more jobs. If the conflicts have not been resolved at this stage, control returns to the step of identification of all remaining job scheduling conflicts. Upon resolution of all conflicts, an overall schedule of all jobs on all machines may be displayed. Additionally, the jobs are then performed on the machines based upon the final, conflict free schedule.

16 Claims, 6 Drawing Sheets

Fig. 2a

| | -8 | -7 | -6 | -5 | -4 | -3 | -2 | -1 | -0 |
|---|---|---|---|---|---|---|---|---|---|
| SCHEDULE FOR MACHINE #4 | | S24 | S34 | S34 | S34 | S14 | | S12 | S41 S51 |
| SCHEDULE FOR MACHINE #3 | | | S23 | S15 S43 | S43 | S53 S43 | S31 | S31 | |
| SCHEDULE FOR MACHINE #2 | | S44 S17 | S44 | | S33 | S13 | S21 S52 | S21 | |
| SCHEDULE FOR MACHINE #1 | S45 | | S16 | S22 | S22 | S22 S32 | S42 | S11 | |
| | -8 | -7 | -6 | -5 | -4 | -3 | -2 | -1 | -0 |

← TIME

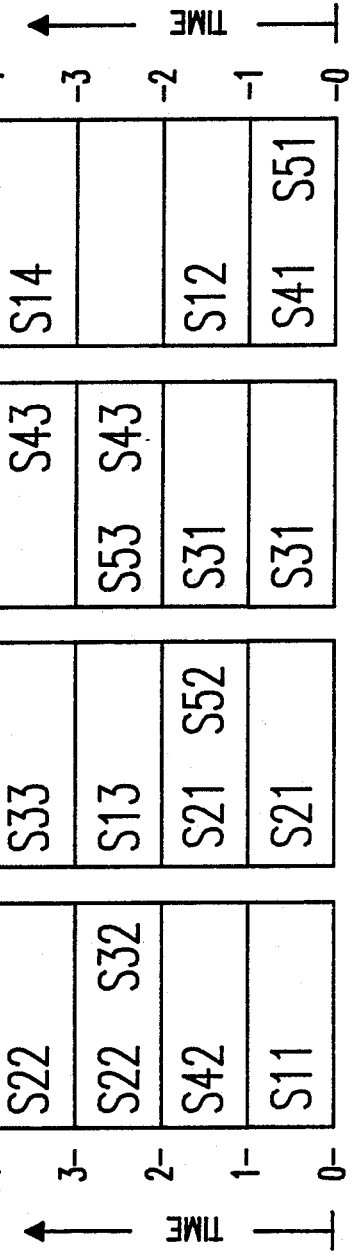

Fig. 2d

SCHEDULE FOR MACHINE #1

| Time | -8 | -7 | -6 | -5 | -4 | -3 | -2 | -1 | -0 |
|---|---|---|---|---|---|---|---|---|---|
| | S45 | S16 | S22 | S22 | S22 | S32 | S42 | S11 | |

← TIME

SCHEDULE FOR MACHINE #2

| | S17 | S44 | S44 | S52 | S33 | S13 | S21 | S21 |
|---|---|---|---|---|---|---|---|---|

SCHEDULE FOR MACHINE #3

| | S53 | S23 | S15 | S43 | S43 | S43 | S31 | S31 |
|---|---|---|---|---|---|---|---|---|

SCHEDULE FOR MACHINE #4

| | S24 | S34 | S34 | S34 | S14 | S51 | S12 | S41 |
|---|---|---|---|---|---|---|---|---|

Time: -8 -7 -6 -5 -4 -3 -2 -1 -0 ← TIME

JOB SHOP SCHEDULING AND PRODUCTION METHOD AND APPARATUS

The present invention is related in general to job shop scheduling and production methods and, more specifically, to an heuristic algorithm, for practice on digital computing apparatus, for the efficient scheduling of jobs on a plurality of machines.

BACKGROUND OF THE INVENTION

The problem solved by the algorithm of the present invention is directed to the scheduling of a first plurality of jobs, each comprising multiple job steps, for processing on a second plurality of machines. Jobs and machines as used herein refer in the most general sense to any types of tasks which are performed on service facilities, e.g. the performance of a sequence of data processing steps on a respective sequence of data processing devices. More specifically, in the context of manufacturing, each job may comprise the plurality of processing steps required to fabricate a particular component, e.g. in silicon wafer processing, where each step is performed on a different processing machine, e.g. ion implanter, diffusion furnace, chemical vapor deposition chamber, etc.

The job scheduling problem has been shown in the art to be NP-complete, so that any exhaustive search through the solution space grows exponentially with the size of the problem. The solution is typically subject to the constraint that each job be scheduled for completion at or before some prescribed due time or as short a time after the due time as possible. All known practical solution methods fall into two categories, one category employing pure search techniques, e.g. branch-and-bound, and the other category using heuristic rules. The techniques in both categories are adapted for practice on a digital computer. In spite of the effort to minimize the amount of computation, the known search techniques nevertheless suffer from excessive demands on computer time. The largest problems reported in the art and solved by these methods remain less than ten jobs scheduled on less than ten machines.

With respect to the approaches employing heuristic rules, most such approaches currently known in the art are of the time-progression type. That is, the solution schedule is generated step-by-step. At each step in the solution process, a queue of jobs waits to be processed at each machine. The choice of which job to process next at each machine is based on heuristic rules, e.g. choose the job with the closest due time. While such heuristic approaches require less computing time as compared to the search techniques, they fail to provide good schedules. One reason for the failure of such approaches is their failure to anticipate future schedule bottlenecks. Heuristic rule approaches which look ahead in time in order to anticipate possible future schedule constraints have been proposed, e.g. in "Heuristics in Job Shop Scheduling" by Gere, Management Science, Vol. 13, 1966, pp. 167–190. The instant inventor is, however, not aware of any such methods generally adopted in the art.

OBJECTS OF THE INVENTION

It is a principal object of the present invention to provide an heuristic algorithm for practice on digital computing apparatus that is not subject to the aforementioned problems and disadvantages.

It is another object of the present invention to provide an heuristic algorithm for practice on digital computing apparatus that looks ahead in time to anticipate and avoid schedule bottlenecks.

It is a further object of the present invention to provide an heuristic algorithm for practice on digital computing apparatus that does not require an excessive amount of computing time to execute.

SUMMARY OF INVENTION

These and other objects of the present invention are achieved by means of a novel job scheduling algorithm, for practice on digital computing apparatus, for scheduling each of a first plurality of production jobs on a second plurality of machines. Each job comprises a sequence of job steps to be respectively performed in a predetermined sequence on the machines, each job step having a predetermined performance duration. It is preferred herein that each job step duration include a machine set-up time. Each job has a total processing time that is the sum of the performance durations of its respective steps and a due time measured relative to an arbitrary schedule start time established for the scheduling of all jobs. The time at which a job is scheduled to commence does not necessarily coincide with the schedule start time. Data is input to the computing apparatus for each job, such data including the sequence of job steps associated with the job, the identity of the machine on which each job step is to be performed, the performance duration of each job step and the job due time.

In accordance with the inventive algorithm, the computing apparatus initially schedules each job for performance on the machines without regard to the scheduling of any other ones of the jobs. The initial schedule for each job is the tightest possible schedule for that job. It is preferred herein that the input data include a time for the commencement of each job in the initial scheduling. Next, all job scheduling conflicts are identified, where each conflict is the scheduling of more than one job step on the same machine at the same time. Following this, the algorithm requires computation of a priority index for each conflict in accordance with the equation:

$$PI = PRP \times MDF \times PSL$$

where:
PI = conflict priority index,
PRP = product of the job process time/job due time ratios of the jobs in the conflict,
MDF = demand factor of the machine on which the conflict occurs, and
PSL = sum of the performance durations of the job steps constituting the conflict.

Having so computed the respective priority indexes of the conflict, a highest priority conflict having the largest computed priority index is selected. Next, for each job step constituting the highest priority conflict, a flexibility index is computed in accordance with the equation:

$$FI = ST - SF$$

where:
FI = job step flexibility index,
ST = job slack time, and
SF = job shift factor.

Having so computed FI for each job step involved in the highest priority conflict, the job step having the lowest computed flexibility index is held fixed in time in the schedule while each remaining job step in the highest priority conflict is relaxed in time until the conflict is resolved.

Having resolved the highest priority conflict, the algorithm next requires relaxing, for each job a step of which was relaxed to resolve the highest priority conflict, the steps succeeding the relaxed step only to the extent necessary to assure the steps of the particular job remain in their predetermined sequence. Having accomplished this, if conflicts remain in the job schedule, the algorithm returns to the scheduling conflict identification step for a repetition of that step and those subsequent thereto. This iterative process is continued until the schedule is conflict free, at which point a representation of the final, conflict free schedule for the performance of the first plurality of jobs on the second plurality of machines is provided.

In the illustrated embodiment of the present invention, the job schedule is divided into equal time increments measured from the start time, the performance duration of each job step being equal to the duration of the equal time increments within which it is performed. As a result, each job step is scheduled to commence at the beginning of one of the time increments and end at the end of one of the time increments.

After generation of the final, conflict free schedule, the first plurality of jobs are then performed on the second plurality of machines based upon the final, conflict free schedule.

BRIEF DESCRIPTION OF THE DRAWINGS

While the specification concludes with claims defining the features of the invention that are regarded as novel, it is believed that the invention, together with further objects thereof will be better understood from a consideration of the following description in conjunction with the drawing figures, in which:

FIGS. 2a-2d illustrate the scheduling of an exemplary scheduling problem in accordance with the present invention.

DESCRIPTION OF THE INVENTION

Figure 1:
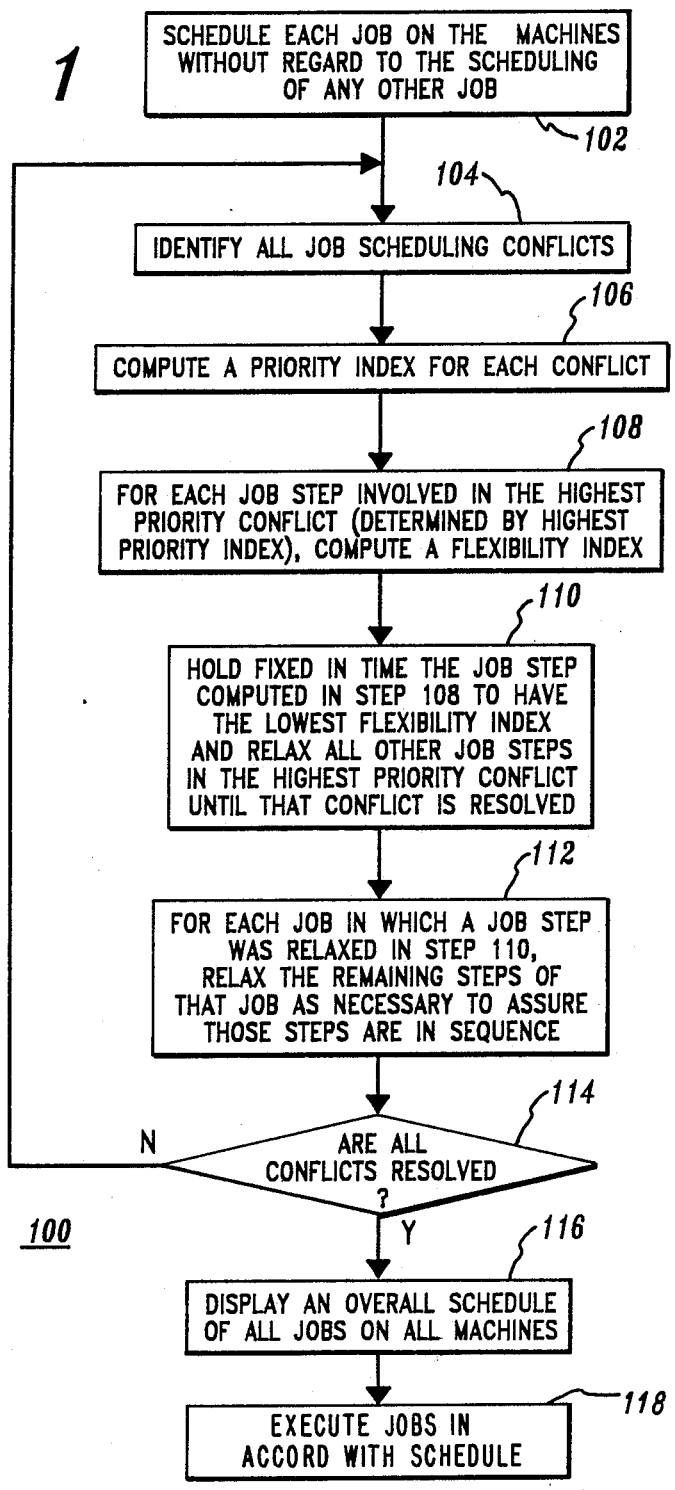
FIG. 1 illustrates a flowchart representation of a preferred computer program embodying the job scheduling algorithm of the present invention.

Referring now to the drawings, FIG. 1 illustrates a flowchart 100 of a preferred computer program embodying the algorithm of the present invention for scheduling a first plurality of jobs on a second plurality of processing machines. Each job to be scheduled is assumed to comprise a predetermined sequence of job steps to be respectively performed on a corresponding sequence of different ones of the machines. It is permissible for nonsuccessive steps in a particular job step sequence to be performed on the same machine. Each job step has a predetermined performance duration which preferably includes the time required for setting up the job on the machine associated with that job step. Each job has a due time that is a time duration measured relative to an arbitrary schedule start time established for the scheduling of all jobs. Each job also has a total processing time that is the sum of the performance durations of its respective job steps. For the practice of the preferred computer program embodying the algorithm of the present invention, it is necessary to provide as input data for each job to be scheduled: (1) the sequence of job steps associated with the job; (2) the identity of machine on which each job step is to be performed; (3) the performance duration of each job step; and (4) the due time of each job.

The steps of the algorithm as embodied in flowchart 100 are illustrated by application to an exemplary scheduling problem in which there are five jobs to be scheduled on four machines. The progress of the algorithm in solving the exemplary problem is illustrated in FIGS. 2a-2d. Each such figure illustrates a separate schedule for each of the four machines, those schedules being respectively designated "SCHEDULE FOR MACHINE #1", "SCHEDULE FOR MACHINE #2", etc. The four schedules for the four machines are divided into a sequence of equal length time slots. A time scale is indicated adjacent the schedules for machine #'s 1 and 4 dividing time into equal time units. The four machine schedules include horizontal line divisions aligning with the time scale divisions in order to partition each machine schedule into the time slot sequence. Thus, the duration of each time slot is 1 time unit. The arbitrary start time is established at TIME=0. The time slots are referred to hereinbelow as time slot #1, time slot #2, etc., such that time slot #1 extends from TIME=0 to TIME=1, time slot #2 extends from TIME=1 to TIME=2, etc. It is important to note that the successful practice of the present invention is not limited to the use of equal length time slots, as will be described in greater detail below.

The representation of each job step has the form $S_{ij}$ where "i" identifies which of the five jobs #'s 1 through 5 the step is associated with and "j" identifies the particular step #. Thus, for example, S32 is the second step of job #3 and S11 is the first step of job #1. In the example, all jobs are due to be complete at TIME=8. As a result, all five jobs have a due time of 8 time units. While all jobs are provided with the same due time to simplify the example, in actual practice the jobs would most likely have different job due times. The successful practice of the present invention is unaffected by whether the respective job due times are all the same of different.

Commencing with step 102 of flowchart 100, each job is scheduled on the machines without regard to the scheduling of any of the other jobs. This initial schedule for each job is required to be the tightest possible schedule therefor. This means there is no idle time between the successive steps of a particular job, i.e. as each step of a job is completed in one time slot, the next step of that job commences, on another machine, in the next time slot. The requirement for tightest possible scheduling in step 102, however, does not include a requirement that the initial scheduling for each job commence at TIME=0. In the illustrated example, each job is in fact initially scheduled to commence at TIME=0. However, this may not be desirable in practice where, for example, it may be preferred that a particular job having a short total processing time be completed at approximately the same point in time as the other jobs being performed. Such a preference may be based on a desire to avoid having to provide storage facilities for work products completed substantially in advance of a shipment date. Thus, in such a case, the particular short processing time job would be initially scheduled to commence at a time after TIME=0. The computer program implementation of such variations in job commencement time may simply be accomplished by including a specified job commencement time with the input data associated with each job. In the alternative, heuristic rules may be embodied in the computer program to enable determination of when a job should be initially scheduled to commence, where such rules would operate to implement preferences such as described above (e.g. avoid storage).

FIG. 2a illustrates the initial scheduling of the five jobs of the exemplary scheduling problem. As can be seen, each schedule is the tightest possible and some job steps have performance durations extending over multiple time slots. For example, step #2 of job #2 (S22) which is performed on machine #1 has a performance duration of 3 time units (time slot #'s 3 through 5). Referring again to FIG. 1, at step 104 of flowchart 100, the algorithm requires the identification of all job scheduling conflicts. A scheduling conflict is defined by considering each job step separately and determining whether the performance of another job step overlaps, in time, the considered job step on the same machine. Reviewing FIG. 2a, the following schedule conflicts between job steps exist. On machine #1: conflict between S22 and S32; on machine #2: conflict between S21 and S52, conflict between S44 and S17; on machine #3: conflict between S53 and S43, conflict between S15 and S43, conflict between S43 and S53 and S15; on machine #4: conflict between S41 and S51, conflict between S24 and S34. The scheduling conflicts on machine #3 provide a good example of how scheduling conflicts are defined. Upon consideration of job step S15, the only job step in conflict therewith is S43. Similarly, upon consideration of job step S53, it is found to be in conflict with step S43. However, upon consideration of job step S43, it is found to be in conflict with both job step S15 and S53. Thus, three distinct conflicts are identified for machine #3.

Referring again to flowchart 100 in FIG. 1, at step 106 a priority index PI is computed for each conflict identified in step 104. The computation of the priority index represents an heuristic approach designed to achieve certain scheduling objectives. The priority index computed for each conflict enables prioritization of the conflicts in accordance with these objectives. The priority index (PI) is computed from the equation:

$$PI = PRP \times MDF \times PSL$$

where:
PRP = product of the job total processing time/job due time ratios of the jobs in the conflict,
MDF = demand factor of the machine on which the conflict occurs, and
PSL = sum of the performance durations of the job steps constituting the conflict.

The inclusion of PRP in determining the PI embodies the heuristic rule that jobs with the tightest schedule should have their conflicts resolved early in the scheduling process. The larger the value of PRP, the tighter the schedule for that particular job. Inclusion of the machine demand factor (MDF) in the PI computation embodies the heuristic rule that conflicts involving machines that are most heavily loaded should be resolved early in the scheduling process. The MDF of each machine is defined to be the sum over all jobs scheduled on the machine of the ratios of the demand time to the due time, where the demand time of a job is the time required by that job on the machine. The more heavily a machine is loaded, the larger its MDF tends to be. As can be seen, the MDF for each machine, once computed, does not change as a schedule is subsequently modified to resolve conflicts. The PSL sum represents the heuristic rule that conflicts involving large numbers of job steps or long steps should be resolved early. Table I, below, summarizes the values of PRP, MDF, PSL and PI for the conflicts in the initial schedule illustrated in FIG. 2a.

TABLE I

| Conflict | PRP | MDF | PSL | PI |
| --- | --- | --- | --- | --- |
| S22/S32 | 0.766 | 1.0 | 4 | 3.064 |
| S21/S52 | 0.328 | 1.0 | 3 | 0.984 |
| S44/S17 | 0.875 | 1.0 | 3 | 2.625 |
| S53/S43 | 0.375 | 1.0 | 4 | 1.500 |
| S15/S43 | 0.875 | 1.0 | 4 | 3.500 |
| S43/S53/S15 | 0.328 | 1.0 | 5 | 1.640 |
| S41/S51 | 0.375 | 1.0 | 2 | 0.750 |
| S24/S34 | 0.766 | 1.0 | 4 | 3.064 |

As can be seen from the Table, the conflict on machine #3 between job steps S15 and S43 has the highest computed priority index.

Referring again to FIG. 1, step 108 is performed next in which a flexibility index FI is computed for each step involved in the conflict computed in step 106 to have the highest priority index. The flexibility index (FI) is computed from the equation:

$$FI = ST - SF$$

where:
ST = job slack time, and
SF = job shift factor.

As in the case of the priority index, the computation of the flexibility index also represents an heuristic approach for achieving scheduling objectives. The job slack time (ST) is defined as the due time minus the remaining processing time for the job. The shift factor (SF) is defined as the amount a job step has to be relaxed, i.e. moved to a later time in the schedule, in order to resolve a scheduling conflict. Two heuristic rules are implemented in the computation of the flexibility index. First, job steps associated with jobs having low slack time should not be relaxed to resolve a scheduling conflict. Second, jobs that need to be shifted the least in order to resolve the scheduling conflict should be relaxed. As can be seen from the equation for computing FI, less flexible job steps will have correspondingly lower values of FI. For the exemplary scheduling problem, the computed FI for steps S15 and S43 (of the highest priority index conflict) are respectively 2 and 0.

Figure 2B:
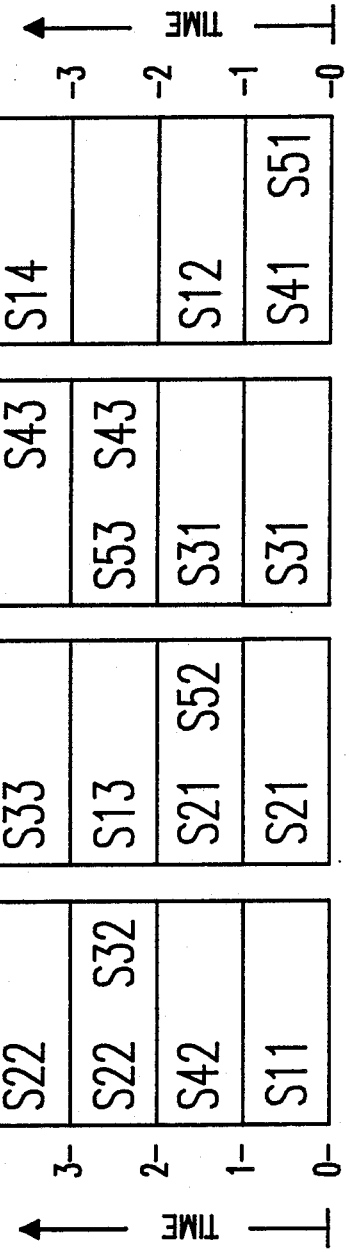

Having computed the value of FI for each job step in the highest priority conflict, step 110 is performed in which the job step having the lowest computed flexibility index is held fixed in time while each remaining job step in the highest priority conflict is relaxed in time until the conflict is resolved. The result of performing this step for the exemplary problem is illustrated in FIG. 2b in which, on the machine #3 schedule, step S15 has been relaxed from time slot #5 to time slot #6 so that the conflict between steps S15 and S43 is resolved.

Referring again to FIG. 1, step 112 is next performed in which for each job, a step of which was relaxed to resolve the highest priority conflict, the steps of the same job succeeding the relaxed step are relaxed only to the extent necessary to assure the steps of that job remain in sequence. The operation of this step is best understood by reference to FIG. 2b. There, it is seen that as a result of relaxing step S15 to time slot #6, it occupies the same time slot as the next step of its job, namely S16 which is schedule on machine #1. It is also noted that the next step of job #1, namely step S17 is scheduled on machine #2 in time slot #7. Flowchart step 112 therefore calls for the relaxation of job steps S16 and S17 each by one time unit. The result of performing this operation is illustrated in FIG. 2c.

Referring again to FIG. 1, the flowchart proceeds to step 114 in which it is determined whether all conflicts in the schedule are resolved. If they are not resolved, as is the case in the exemplary problem as illustrated in FIG. 2c, steps 104 through 112 are repeated. Thus, the iteration through these steps is repeated until all conflicts in the schedule are resolved. Upon the ultimate resolution of all scheduling conflicts, the flowchart proceeds to step 116 in which a representation of the final, conflict free schedule is provided, such as on a CRT display screen or a hard copy printout. In a broader sense, the representation could be provided to other data processing apparatus which directly controls some automated portion of the overall job processing for execution in accordance with the schedule. Step 118 shows the execution of the jobs in accord with the schedule. FIG. 2d illustrates the final, conflict free schedule resulting from the performance of steps 102 through 114 on the exemplary scheduling problem.

Figure 3:
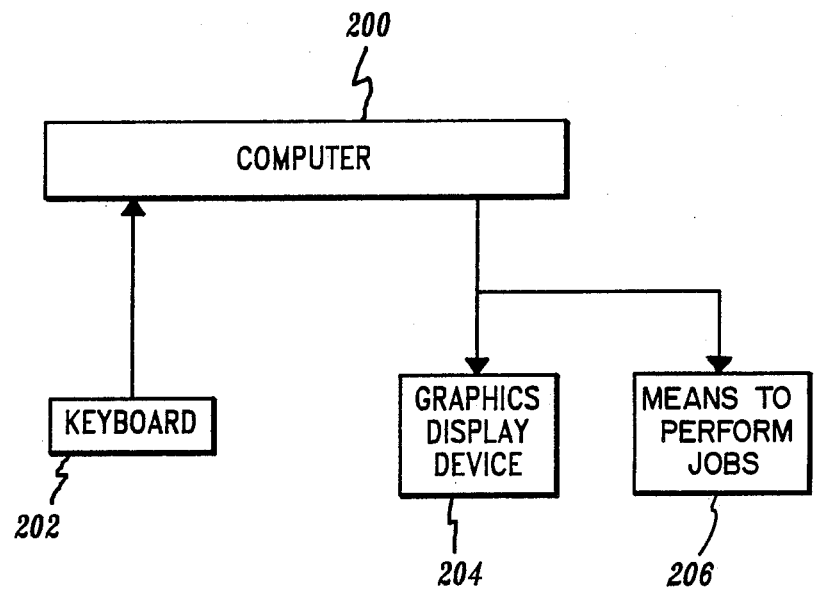
FIG. 3 diagrammatically illustrates a computing system on which the algorithm of the present invention may be successfully practiced.

The method of the present invention may be practiced on any conventional digital computing apparatus such as diagrammatically illustrated in FIG. 3. There, the program illustrated by flowchart 100 is stored for execution in a computer 200, e.g. such as an IBM PC/AT personal computer. The data inputs described above may be entered into the computer through an associated keyboard device 202. The final, conflict free schedule would preferably be displayed on a graphics display device 204 such as a CRT additionally, the computer 200 could be connected to means 206 for performing the jobs in accord with the schedule. The means 206 could be a data processing apparatus as discussed above. The program embodying the inventive algorithm would preferably be written in a conventional programming language such as "C". The program has, however, been successfully implemented on a Symbolics 3600 workstation manufactured by Symbolics, Inc. of Concord, MA, using the KEE TM expert system shell available from Intelicorp of Mountain View, CA.

In the above described implementation using the KEE TM system, the inventive algorithm was successfully practiced to solve the problem of scheduling ten jobs on ten machines. The computing time required for this solution was under thirty minutes. The inventor believes the amount of computing time would be less for the practice of the algorithm on a conventional computer using a conventional language, e.g. "C". The inventor further believes such computing times are faster than would be required by the prior art methods as practiced on the same problem. It is noted that while the scaling of the computing time required to handle larger scheduling problems has not been thoroughly investigated, the problem solution time in accordance with the inventive algorithm is definitely less than the NP-complete case.

While the scheduling algorithm of the present invention has been illustrated and described hereinabove for practice on a schedule composed of equal length time slots, the invention is not so limited. The invention may be practiced with equal effectiveness by dispensing with time slots and simply scheduling each job on a continuous time scale in accordance with the actual durations of the respective job steps. For example, referring again to FIG. 2a and the initial schedule, if step S11 has a duration of 0.8 time units on machine #1, then job step S12 would be scheduled to commence on machine #4 at TIME=0.8.

While the algorithm of the present invention has been illustrated and described for implementation by the programming of digital computing apparatus, the invention is not so limited. Such programming embodying the algorithm may instead be embedded in the read only memory (ROM) associated with a microprocessor device so that the device may perform the algorithm upon being provided with the above described input data.

While a preferred embodiment has been illustrated and described herein, it will be obvious that numerous modifications, changes, variations, substitutions and equivalents, in whole or in part, will now occur to those skilled in the art without departing from the spirit and scope contemplated by the invention. Accordingly, it is intended that the invention herein be limited only by the scope of the appended claims.

What is claimed is:

1. A method for performing a first plurality of production jobs on a second plurality of machines, each said job comprising a sequence of job steps to be respectively performed in a predetermined sequence on said machines, each said job step having a predetermined performance duration, each said job having a total processing time that is the sum of the performance durations of its respective steps and a due time measured relative to an arbitrary schedule start time, said method comprising the steps of:

(a) initially scheduling each said job for performance on said machines without regard to the scheduling of any other ones of said jobs, the initial scheduling for each said job being the tightest possible schedule for that job;

(b) identifying all job scheduling conflicts, each said conflict being the scheduling of more than one said job step on the same machine at the same time;

(c) computing a priority index for each said conflict in accordance with the equation:

$$PI = PRP \times MDF \times PSL$$

where:
PI = conflict priority index;
PRP = product of the job process time/job due time ratios of the jobs in said conflict;
MDF = demand factor of the machine on which said conflict occurs;
PSL = sum of the performance durations of the job steps constituting said conflict;

(d) selecting a highest priority conflict having the largest computed priority index;

(e) computing, for each job step constituting said highest priority conflict, a flexibility index in accordance with the equation:

$$FI = ST - SF$$

where:
FI = job step flexibility index;

ST=job slack time;
SF=job shift factor;

(f) holding fixed in time in said schedule within said highest priority conflict the job step having the lowest computed flexibility index while relaxing in time each remaining job step in said highest priority conflict until that conflict is resolved;

(g) relaxing, for each said job a step of which was relaxed to resolve said highest priority conflict, the steps succeeding the relaxed step only to the extent necessary to assure the steps of said job remain in said predetermined sequence;

(h) returning to step (b) if there remain any scheduling conflicts;

(i) providing a final, conflict free schedule for the performance of said first plurality of jobs on said second plurality of machines; and (j) performing said first plurality of production jobs on said second plurality of machines based on said final, conflict free schedule.

2. The method of claim 1 wherein in step (a) the initial scheduling of each said job can include jobs commencing after said start time.

3. The method of claim 1 wherein time on said job schedule is divided into equal time increments measured from said start time, the performance duration of each said job step being equal to the duration of said equal time increments within which it can be performed, so that each said job step is scheduled to commence at the beginning of one of said time increments and end at the end of one of said time increments.

4. The method of claim 1 wherein said performance duration of each said job step includes a machine set-up time.

5. A method of production using digital computing apparatus to prepare a job schedule for each of a first plurality of production jobs on a second plurality of machines, each said job comprising a sequence of job steps to be respectively performed in a predetermined sequence on said machines, each said job step having a predetermined performance duration, each said job having a total processing time that is the sum of the performance durations of its respective steps and a due time measured relative to an arbitrary schedule start time, said method comprising the steps of:

(a) inputting to said computing apparatus as data for each said job:
   (i) the sequence of steps associated therewith;
   (ii) the identity of the machine on which each said job step is to be performed;
   (iii) the performance duration of each said job step; and
   (iv) the due time (b) operating said digital computing apparatus to perform the steps of:
   initially scheduling each said job for performance on said machines without regard to the scheduling of any other ones of said jobs, the initial scheduling for each said job being the tightest possible schedule for that job;
   identifying all job scheduling conflicts, each said conflict being the scheduling of more than one said job step on the same machine at the same time;
   computing a priority index for each said conflict in accordance with the equation:

$$PI = PRP \times MDF \times PSL$$

where:
PI=conflict priority index;
PRP=product of the job process time/job due time ratios of the jobs in said conflict;
MDF=demand factor of the machine on which said conflict occurs;
PSL=sum of the performance durations of the job steps constituting said conflict;

selecting a highest priority conflict having the largest computed priority index;

computing, for each job step constituting said highest priority conflict, a flexibility index in accordance with the equation:

$$FI = ST - SF$$

where:
FI=job step flexibility index;
ST=job slack time;
SF=job shift factor;

holding fixed in time in said schedule within said highest priority conflict the job step having the lowest computed flexibility index while relaxing in time each remaining job step in said highest priority conflict until that conflict is resolved;

relaxing, for each said job a step of which was relaxed to resolve said highest priority conflict, the steps succeeding the relaxed step only to the extent necessary to assure the steps of said job remain in said predetermined sequence;

returning to the scheduling conflicts identifying step if there remain any scheduling conflicts; and providing a representation of a final, conflict free schedule for the performance of said first plurality of jobs on said second plurality of machines; and (c) performing said first plurality of production jobs on said second plurality of machines based on said final, conflict free schedule.

6. The method of claim 5 wherein in step (a) the data further includes a time at which each said job is to commence in the initial scheduling thereof.

7. The method of claim 5 wherein time on said job schedule is divided into equal time increments measured from said start time, the performance duration of each said job step being equal to the duration of said equal time increments within which it can be performed, so that each said job step is scheduled to commence at the beginning of one of said time increments and end at the end of one of said time increments.

8. The method of claim 5 wherein said performance duration of each said job step includes a machine set-up time.

9. Apparatus for performing a first plurality of production jobs on a second plurality of machines, each said job comprising a sequence of job steps to be respectively performed in a predetermined sequence on said machines, each said job step having a predetermined performance duration, each said job having a total processing time that is the sum of the performance durations of its respective steps and a due time measured relative to an arbitrary schedule start time, said apparatus comprising:

means for initially scheduling each said job for performance on said machines without regard to the scheduling of any other ones of said jobs, the initial scheduling for each said job being the tightest possible schedule for that job;

means for identifying all job scheduling conflicts, each said conflict being the scheduling of more than one said job step on the same machine at the same time;

means for computing a priority index for each said conflict in accordance with the equation:

$$PI = PRP \times MDF \times PSL$$

where:
PI = conflict priority index;
PRP = product of the job process time/job due time ratios of the jobs in said conflict;
MDF = demand factor of the machine on which said conflict occurs;
PSL = sum of the performance durations of the job steps constituting said conflict;

means for selecting a highest priority conflict having the largest computed priority index;

means for computing, for each job step constituting said highest priority conflict, a flexibility index in accordance with the equation:

$$FI = ST - SF$$

where:
FI = job step flexibility index;
ST = job slack time;
SF = job shift factor;

means for holding fixed in time in said schedule within said highest priority conflict the job step having the lowest computed flexibility index while relaxing in time each remaining job step in said highest priority conflict until that conflict is resolved;

means for relaxing, for each said job a step of which was relaxed to resolve said highest priority conflict, the steps succeeding the relaxed step only to the extent necessary to assure the steps of said job remain in said predetermined sequence;

means for continuing to resolve scheduling conflicts until all conflicts are resolved;

means for providing a representation of a final, conflict free schedule for the performance of said first plurality of jobs on said second plurality of machines; and means for performing said first plurality of production jobs on said second plurality of machines based on said final, conflict free schedule.

10. The apparatus of claim 9 wherein the initial scheduling of each said job can include jobs commencing after said start time.

11. The apparatus of claim 9 wherein time on said job schedule is divided into equal time increments measured from said start time, the performance duration of each said job step being equal to the duration of said equal time increments within which it can be performed, so that each said job step is scheduled to commence at the beginning of one of said time increments and end at the end of one of said time increments.

12. The apparatus of claim 9 wherein said performance duration of each said job step includes a machine set-up time.

13. Apparatus for performing a first plurality of production jobs on a second plurality of machines, each said job comprising a sequence of job steps to be respectively performed in a predetermined sequence on said machines, each said job step having a predetermined performance duration, each said job having a total processing time that is the sum of the performance durations of its respective steps and a due time measured relative to an arbitrary schedule start time, said apparatus comprising:

programmed digital computing apparatus for performing the steps of:

(a) initially scheduling each said job for performance on said machines without regard to the scheduling of any other ones of said jobs, the initial scheduling for each said job being the tightest possible schedule for that job;

(b) identifying all job scheduling conflicts, each said conflict being the scheduling of more than one said job step on the same machine at the same time;

(c) computing a priority index for each said conflict in accordance with the equation:

$$PI = PRP \times MDF \times PSL$$

where:
PI = conflict priority index;
PRP = product of the job process time/job due time ratios of the jobs in said conflict;
MDF = demand factor of the machine on which said conflict occurs;
PSL = sum of the performance durations of the job steps constituting said conflict;

(d) selecting a highest priority conflict having the largest computed priority index;

(e) computing, for each job step constituting said highest priority conflict, a flexibility index in accordance with the equation:

$$FI = ST - SF$$

where:
FI = job step flexibility index;
ST = job slack time;
SF = job shift factor;

(f) holding fixed in time in said schedule within said highest priority conflict the job step having the lowest computed flexibility index while relaxing in time each remaining job step in said highest priority conflict until that conflict is resolved;

(g) relaxing, for each said job a step of which was relaxed to resolve said highest priority conflict, the steps succeeding the relaxed step only to the extent necessary to assure the steps of said job remain in said predetermined sequence;

(h) returning to step (b) if there remain any scheduling conflicts;

(i) providing a representation of a final, conflict free schedule for the performance of said first plurality of jobs on said second plurality of machine; and means for performing said first plurality of production jobs on said second plurality of machines based on said final, conflict free schedule.

14. The apparatus of claim 13 wherein in programmed step (a) the initial scheduling of each said job can include jobs commencing after said start time.

15. The apparatus of claim 13 wherein time on said job schedule is divided into equal time increments measured from said start time, the performance duration of each said job step being equal to the duration of said equal time increments within which it can be performed, so that each said job step is scheduled to commence at the beginning of one of said time increments and end at the end of one of said time increments.

16. The apparatus of claim 13 wherein said performance duration of each said job step includes a machine set-up time.

* * * * *